United States Patent
Wang

(10) Patent No.: US 6,700,778 B1
(45) Date of Patent: Mar. 2, 2004

(54) FAULT-TOLERANT POWER SUPPLY MODULE FOR PERSONAL COMPUTER PROCESSOR

(76) Inventor: Joseph Wang, 9F, No. 196-7 Datung Rd., Shijr City (TW)

( * ) Notice: Subject to any disclaimer, the term of this patent is extended or adjusted under 35 U.S.C. 154(b) by 0 days.

(21) Appl. No.: 10/407,458

(22) Filed: Apr. 7, 2003

(30) Foreign Application Priority Data

Sep. 28, 2002 (CN) .......................................... 02 2 60373

(51) Int. Cl.⁷ .............................................. H05K 7/20
(52) U.S. Cl. ...................... 361/690; 361/695; 361/716; 174/16.1; 454/184
(58) Field of Search .............................. 361/683–687, 361/688, 694, 695, 715, 716, 724, 727; 174/16.1; 165/80.3; 312/223.2, 236; 454/184

(56) References Cited

U.S. PATENT DOCUMENTS

| | | | | |
|---|---|---|---|---|
| 5,808,867 A | * | 9/1998 | Wang | 361/695 |
| 5,808,876 A | * | 9/1998 | Mullenbach et al. | 361/788 |
| 6,038,126 A | * | 3/2000 | Weng | 361/679 |
| 6,246,580 B1 | * | 6/2001 | Weng | 361/695 |
| 6,304,443 B1 | * | 10/2001 | Chou | 361/695 |
| 6,445,586 B1 | * | 9/2002 | Chou | 361/725 |
| 6,473,297 B1 | * | 10/2002 | Behl et al. | 361/685 |

* cited by examiner

Primary Examiner—Boris Chérvinsky
(74) Attorney, Agent, or Firm—Birch, Stewart, Kolasch & Birch, LLP

(57) ABSTRACT

A fault-tolerant power supply module for a personal computer processor includes a primary frame that has two corresponding slide racks located therein to form a retrieval space to house a power supply device and a secondary frame fastened to a seal side of the primary frame with a front end formed a power supply socket cluster. The retrieval space corresponds to a wide span area of a preset opening formed on the rear end of the personal computer processor and the power supply socket cluster corresponds to a narrow span area of the opening such that the structure conforms to existing common opening specifications and also can accommodate the retrievable fault-tolerant power supply module.

8 Claims, 6 Drawing Sheets

FAULT-TOLERANT POWER SUPPLY MODULE FOR PERSONAL COMPUTER PROCESSOR

This nonprovisional application claims priority under 35 U.S.C. §119(a) on Patent Application No(s). 02260373.5 filed in China on Sep. 28, 2002, which is(are) herein incorporated by reference.

FIELD OF THE INVENTION

The present invention relates to a fault-tolerant power supply module for a personal computer (PC) processor and particularly a power supply module to supply electric power to an upright or horizontal desktop PC processor.

BACKGROUND OF THE INVENTION

The rapid technology innovation and development have greatly shortened the time of product replacement or upgrade. This is especially true for computer related products. Users often baffle the appropriate timing of purchasing or upgrading the devices, or whether to buy new ones to replace the old. In order to give consumers a balanced choice and simplify computer product design, these days most vendors try to offer compatibility and common specifications on products of similar nature. For instance, optical disk drives and disk drives have unified specifications. Besides reducing production cost, it also makes repairs and maintenance much easier.

In order to conform to this trend, computer power supply manufacturers also have reached some common understandings and developed power supply devices with common specifications. The casings to accommodate the power supply devices also have openings of the same specifications for connecting the power supply devices. However, at present power supply devices of AT or ATX specifications are fixedly installed inside the casings. Moreover, all of those power supply devices have the air fan mounted thereon. The air fan generally has the shortest life span. Once the air fan malfunctions or damages due to accumulation of dusts, the entire set of the power supply device has to be removed for repairs. And this will result in shutting down of the computer. Moreover, the growing popularity of multimedia operation has created greater power demands. The 250V specification now being generally adopted for power supply devices becomes not adequate to meet these requirements. To increase power supply, the whole set of power supply device must be removed for replacement. It incurs a lot of troubles.

Applicant discovers that in industrial server computers, many power supply devices adopt fault-tolerant design and have a retrievable construction to facilitate repairs and maintenance. However such a concept and design cannot be adopted on desktop personal computers due to the preset openings of the processor casing are formed according to standard specifications. This is a big drawback for the present personal computers. Nowadays, personal computers are very popular, and users are more sophisticated in technical knowledge and skills. With technology information becomes widely available, many users are capable of installing and disassembling computer facilities. To provide a design and structure that enables users to disassemble and install computer related facilities without affecting computer operation would be a great benefit to users.

SUMMARY OF THE INVENTION

Therefore the primary object of the invention is to resolve the aforesaid disadvantages. The power supply module of the invention includes a primary frame that has two corresponding slide racks located therein to form a retrieval space to house a power supply device and a secondary frame fastened to a seal side of the primary frame with a front end formed a power supply socket cluster. The retrieval space corresponds to a wide span area in a preformed opening on the rear end of the PC processor for the power supply module. The power supply socket cluster corresponds to a narrow span area of the opening. Such a structure conforms to the existing opening specifications and also can accommodate the fault-tolerant power supply module.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
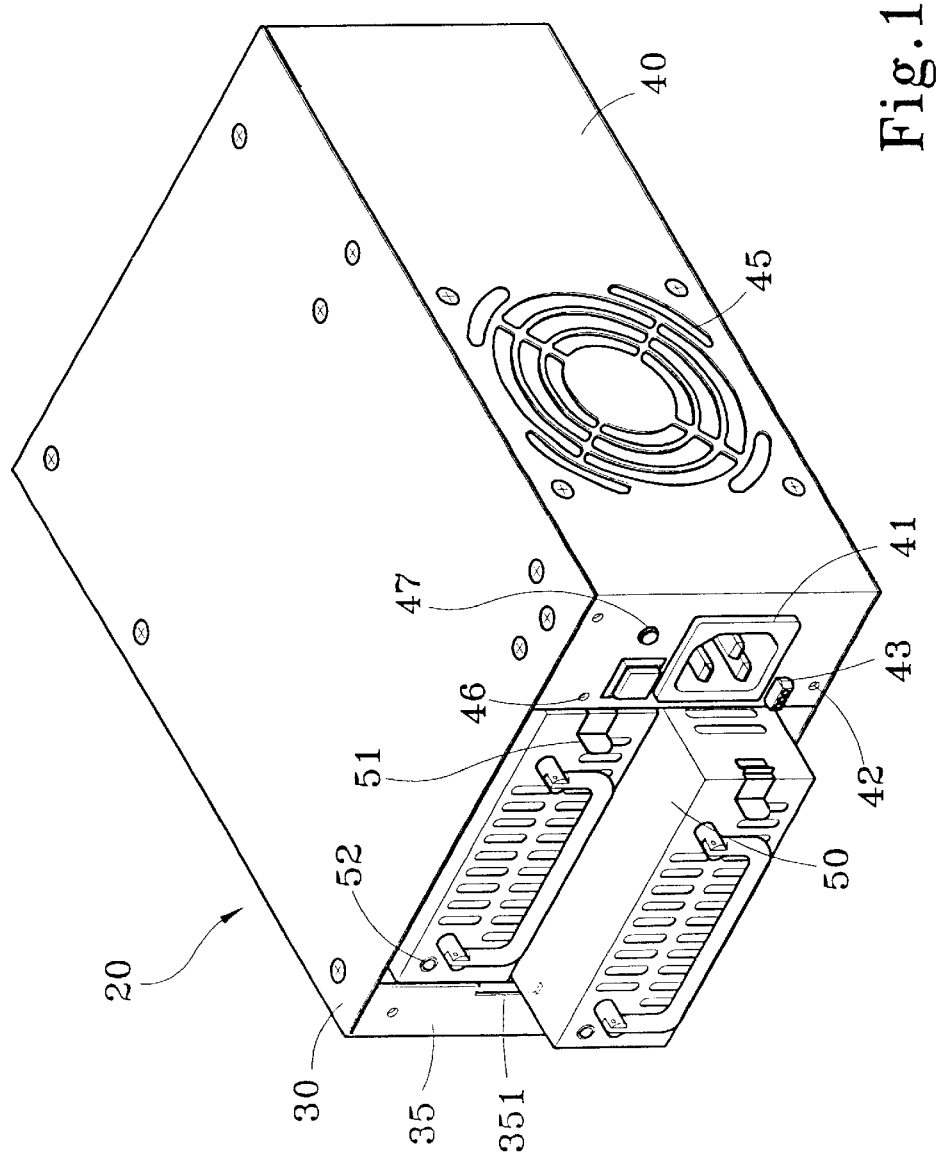
FIG. 1 is a perspective view of the invention.
Figure 2:
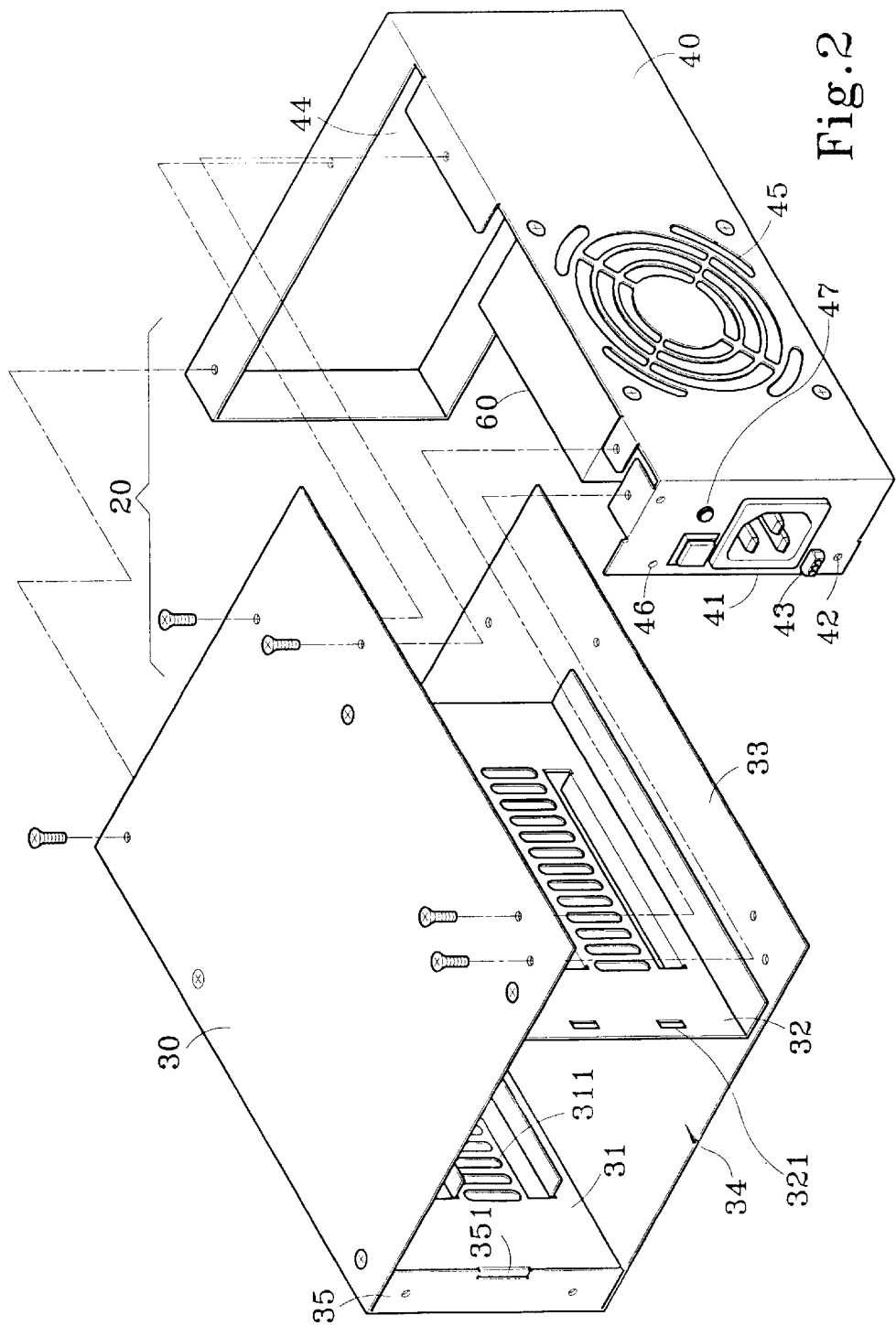
FIG. 2 is a fragmentary exploded view of the invention.
Figure 3:
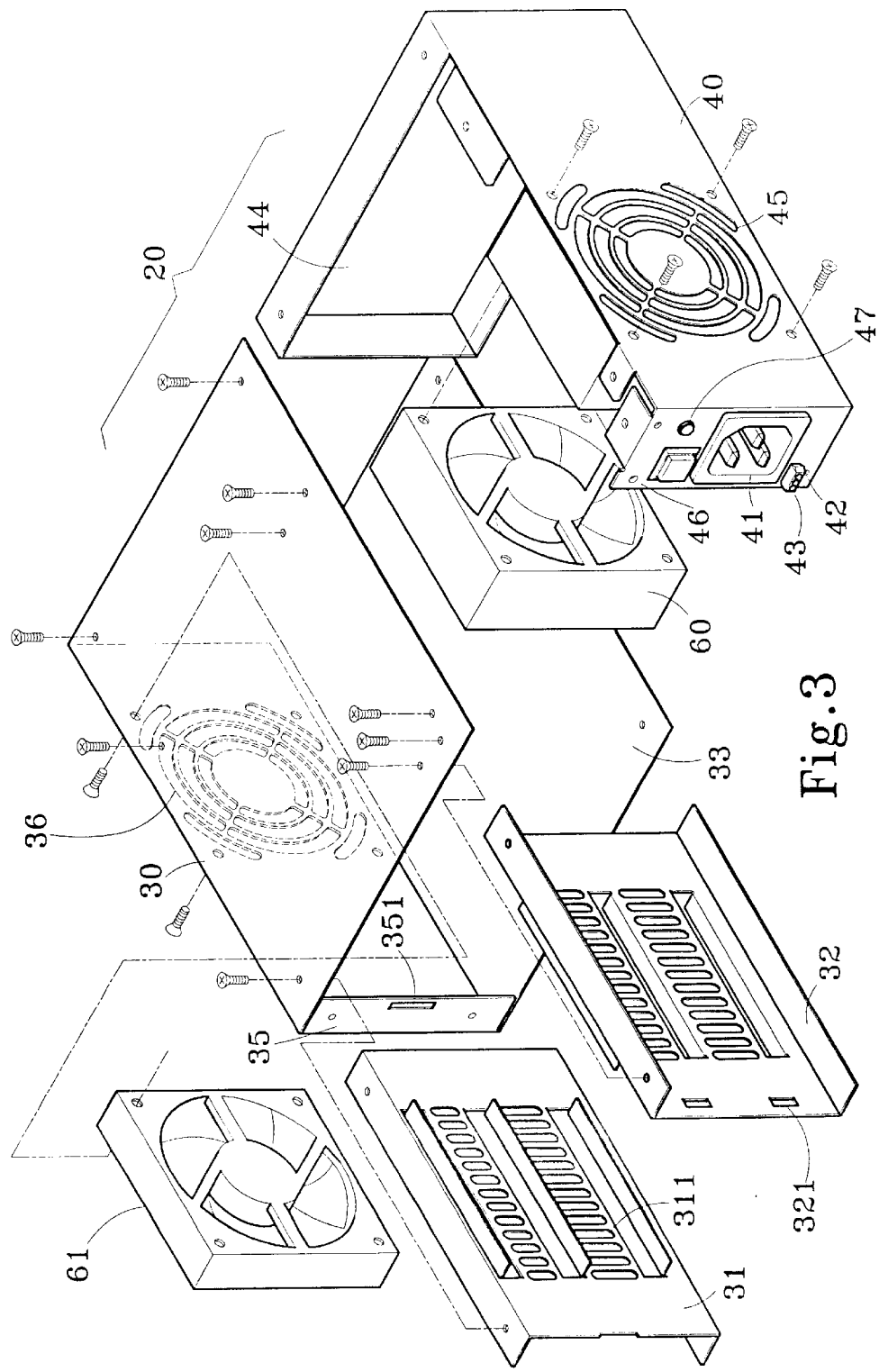
FIG. 3 is an exploded view of the invention.

Referring to FIGS. 1, 2, and 3, the invention is to mount a retrievable fault-tolerant power supply module 20 onto a preset and matched opening 11 formed on the rear end of a PC processor 10. The power supply module 20 includes a ⊂-shaped primary frame 30 which has a first slide rack 31 and a second slide rack 32 located therein and corresponded to each other to form a retrieval space 34 for a power supply device 50. The two slide racks 31 and 32 are spaced from two sides of the primary frame 30 to form respectively a fastening zone 33. One side of the primary frame 30 on one fastening zone 33 is bent and extended to form an anchor plate 35 located on one side of the opening 11 to engage with a fastening element 13. Another side of the primary frame 30 where another fastening zone 33 is located is a seal side to fasten to the L-shaped secondary frame 40. The secondary frame 40 has a rear end formed a wiring slot 44 to enable the power cord of the power supply device 50 to pass through. The secondary frame 40 has a front end to form a power supply socket cluster 41 and an anchor section 42 located on another side of the opening 11 for engaging with another fastening element 13. In addition, the primary frame 30 and the first slide rack 31 form a first radiation space therebetween for housing a first air fan 61, and the secondary frame 40 and the second slide rack 32 form a second radiation space therebetween for housing a second air fan 60. The primary frame 30, the secondary frame 40 and the slide racks 31 and 32 have respectively ventilation vents 36, 45 and 311 for heat dissipation.

Figure 4:
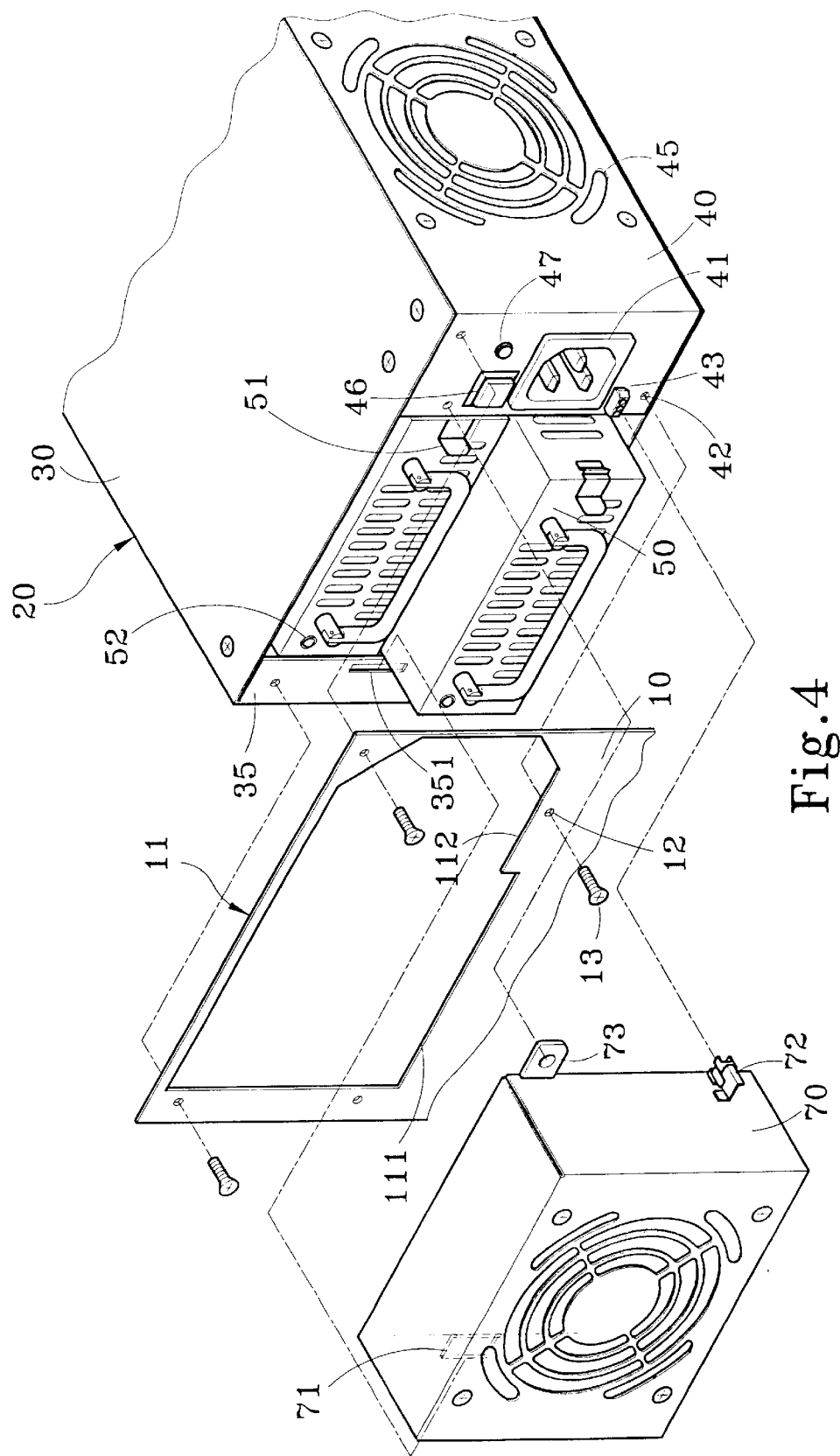
FIG. 4 is a schematic view of another embodiment of the invention.
Figure 5:
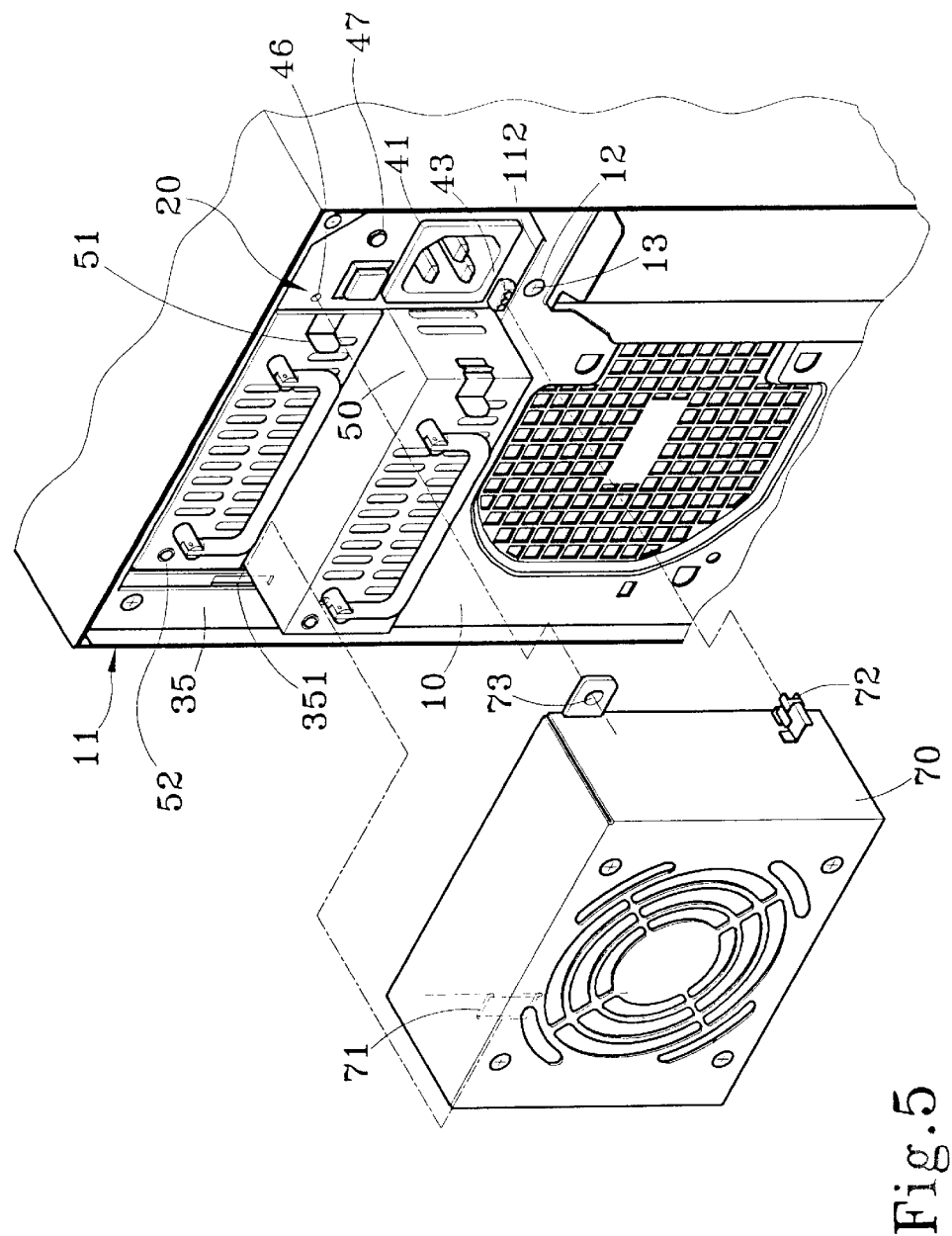
FIGS. 5 and 6 are schematic views of another embodiment of the invention in various installation conditions.
Figure 6:
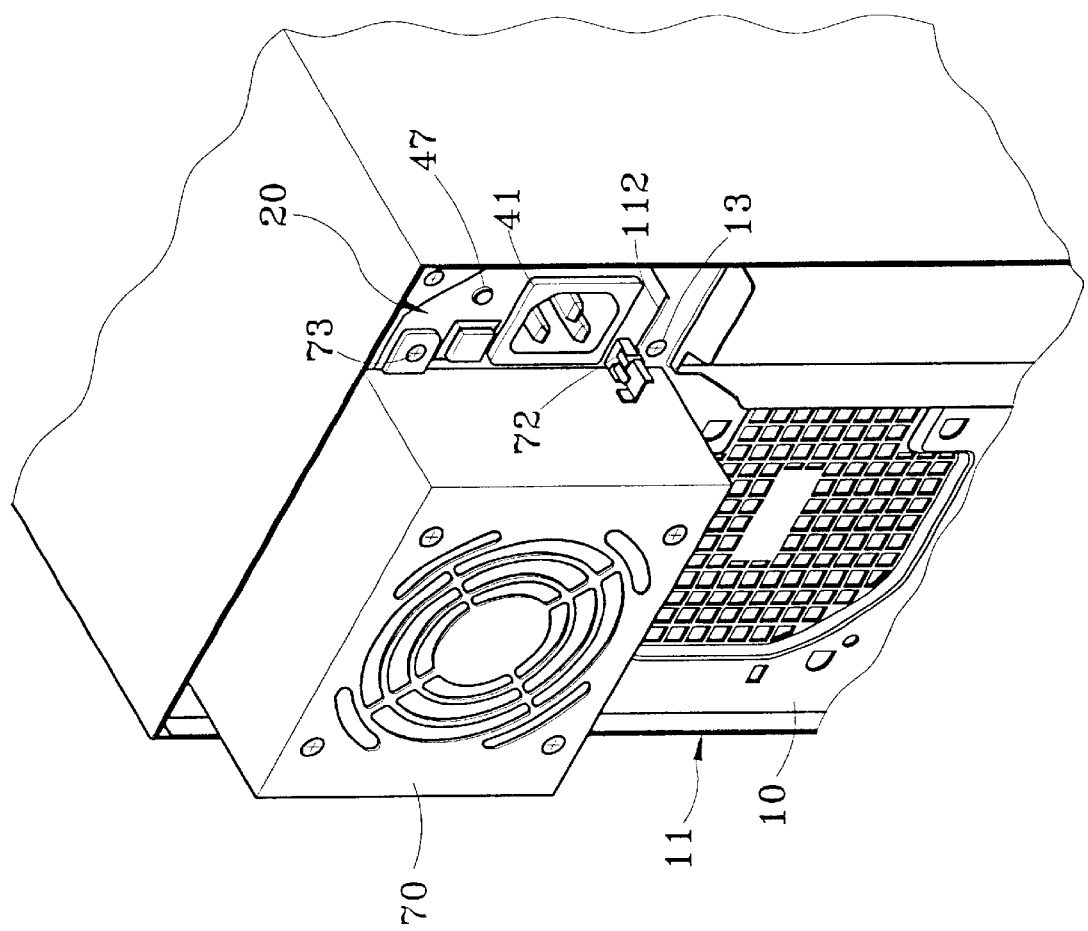

As shown in FIG. 4, the preset opening 11 formed on the PC processor 10 for mounting the power supply module 20 is made according to common specifications. It includes a wide span area 111 for retrieval of the power supply device 50 and a narrow span area 112 for accommodating the power supply socket cluster 41. There are fastening holes 12 on the periphery of the opening 11 that also conform to standard specifications. Hence the invention is made according to the common specifications. Referring to FIGS. 5 and 6, after the invention has been assembled, the first slide rack 31 and the second slide rack 32 form the retrieval space 34 therebetween that matches the wide span area 111 of the opening 11 for housing the power supply device 50. The power supply socket cluster 41 located on the front end of the secondary frame 40 matches the narrow span area 112 of the opening 11. The fastening holes 12 on the periphery of the opening 11 may receive fastening elements 13 to engage with the anchor plate 35 of the primary frame 30 and the anchor section 42 of the secondary frame 40 to couple the two together. The second slide rack 32 further has anchor slots 321 to couple with anchor ledges 51 formed on the power supply device 50. The secondary frame 40 and the power supply device 50 have respectively light emitting diodes 47 and 52 for indicating operation conditions of the power supply device 50. Heat dissipation for the power supply device 50 may be accomplished by means of the first air fan 61 located in the first radiation space formed between the primary frame 30 and the first slide rack 31, and the second air fan 60 located in the second radiation space formed between the secondary frame 40 and the second slide rack 32, and the ventilation vents 36, 45 and 311 formed respectively on the primary frame 30, secondary frame 40 and slide racks 31 and 32. In addition, the anchor plate 35 of the primary frame 30 may have a notch 351, and the secondary frame 40 may have a power supply jack 43 located on the front end thereof. A third air fan 70 may be provided. The third air fan 70 has a flap 71 extended from one side to couple with the notch 351 and a power plug 72 extended from another side thereof to engage with the power supply jack 43. The third aid fan 70 further has a lug 73 extended from another side to fasten to an anchor hole 46 formed on the secondary frame 40 through one fastening element 13 so that the external third air fan 70 may be mounted securely to aid heat dissipation. The third air fan 70 may be removed and replaced immediately whenever it has accumulated too much dusts and has the risk of breaking down. Thus users may directly remove the power supply device 50 for replacement whenever desired without disassembling the whole equipment.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fault-tolerant power supply module for a personal computer processor corresponding to a preset opening matched a retrievable power supply module and formed on a rear end of the personal computer processor, comprising:

a primary frame having a first slide rack and a second slide rack located therein and corresponded to each other to form a retrieval space for a power supply device, the two slide racks being spaced from two sides of the primary frame to form respectively a fastening zone, the primary frame having one side bordered one fastening zone and bent and extended to form an anchor plate located on one side of the opening to engage with a fastening element; and a secondary frame fastening to a side opposite to said one side of the primary frame on another fastening zone and having a front end formed a power supply socket cluster and an anchor section located on another side of the opening to engage with another fastening element;

wherein the opening includes a wide span area corresponding to the power supply device and a narrow span area corresponding to the power supply socket cluster such that the opening is allowed to accommodate the retrievable fault-tolerant power supply module without altering the specification thereof.

2. The fault-tolerant power supply module of claim 1, wherein the secondary frame has a rear end formed a wiring slot to allow a power cord to pass through.

3. The fault-tolerant power supply module of claim 1, wherein the primary frame and the first slide rack form a first radiation space therebetween for housing a first air fan, the primary frame and the first slide rack having respectively ventilation vents formed thereon for dissipating heat.

4. The fault-tolerant power supply module of claim 1, wherein the secondary frame and the second slide rack form a second radiation space therebetween for housing a second air fan, the secondary frame and the second slide rack having respectively ventilation vents formed thereon for dissipating heat.

5. The fault-tolerant power supply module of claim 1, wherein the anchor plate of the primary frame has a notch and the secondary frame has a power supply jack located on the front end thereof, a third air fan being provided which has a flap extended from one side to couple with the notch and a power supply plug extended from another side thereof to engage with the power supply jack to aid heat dissipation.

6. The fault-tolerant power supply module of claim 5, wherein the third air fan has a lug extended from another side thereof to fasten to an anchor hole formed on the secondary frame through a fastening element.

7. The fault-tolerant power supply module of claim 1, wherein the second slide rack has anchor slots formed on a lateral side thereof for anchoring the power supply device.

8. The fault-tolerant power supply module of claim 1, wherein the secondary frame has light emitting diodes located on the front end thereof for indicating operation conditions of the power supply device.

* * * * *